(12) United States Patent
Ludwig

(10) Patent No.: US 10,138,717 B1
(45) Date of Patent: Nov. 27, 2018

(54) PREDICTING WELL PERFORMANCE WITH FEATURE SIMILARITY

(71) Applicant: Novi Labs, LLC, Austin, TX (US)

(72) Inventor: Jon Ludwig, Austin, TX (US)

(73) Assignee: Novi Labs, LLC, Austin, TX (US)

( * ) Notice: Subject to any disclaimer, the term of this patent is extended or adjusted under 35 U.S.C. 154(b) by 432 days.

(21) Appl. No.: 14/590,648

(22) Filed: Jan. 6, 2015

Related U.S. Application Data

(60) Provisional application No. 61/924,457, filed on Jan. 7, 2014.

(51) Int. Cl.
- *G06G 7/48* (2006.01)
- *E21B 43/00* (2006.01)
- *G01V 99/00* (2009.01)
- *E21B 49/00* (2006.01)

(52) U.S. Cl.
CPC ............ *E21B 43/00* (2013.01); *E21B 49/003* (2013.01); *G01V 99/005* (2013.01)

(58) Field of Classification Search
None
See application file for complete search history.

(56) References Cited

U.S. PATENT DOCUMENTS

| | | | |
|---|---|---|---|
| 4,181,176 A | 1/1980 | Frazier | |
| 4,548,071 A | 10/1985 | Habiger | |
| 7,225,078 B2 | 5/2007 | Shelley et al. | |
| 8,417,715 B1 * | 4/2013 | Bruckhaus | G06F 17/30994 705/26.1 |
| 8,788,209 B2 * | 7/2014 | Foot | G01V 11/00 702/12 |
| 8,798,970 B2 | 8/2014 | Sung | |
| 9,576,246 B2 * | 2/2017 | Martin | G06N 99/005 |
| 2003/0065635 A1 * | 4/2003 | Sahami | G06F 17/30705 706/48 |
| 2006/0092766 A1 * | 5/2006 | Shelley | G01V 11/00 367/72 |
| 2007/0016389 A1 * | 1/2007 | Ozgen | E21B 47/00 703/10 |
| 2007/0226158 A1 * | 9/2007 | Woronow | G01V 11/00 706/17 |
| 2008/0234939 A1 * | 9/2008 | Foot | E21B 43/00 702/12 |

(Continued)

OTHER PUBLICATIONS

Quinlan Learning With Continuous Classes Proceedings AI'92, pp. 1-6, 1992.*

(Continued)

*Primary Examiner* — Aniss Chad
*Assistant Examiner* — Cuong V Luu
(74) *Attorney, Agent, or Firm* — McDonnell Boehnen Hulbert & Berghoff LLP

(57) ABSTRACT

A first set of input features related to wells and a set of output characteristics related to the wells may be obtained. For each of a plurality of operational wells, input factor values for the input features of the respective operational wells and output characteristic values for the output characteristics of the respective operational wells may also be obtained. At least some of the input factor values and output characteristic values may be compared. Based on the comparison, a second set of input features that influence the output characteristics may be determined. The second set may be a subset of the first set.

17 Claims, 6 Drawing Sheets

(56) References Cited

U.S. PATENT DOCUMENTS

| | | | |
|---|---|---|---|
| 2009/0260880 A1* | 10/2009 | Thambynayagam | E21B 43/00 175/45 |
| 2010/0023269 A1* | 1/2010 | Yusti | E21B 43/00 702/12 |
| 2010/0174517 A1 | 7/2010 | Slupphaug et al. | |
| 2010/0300682 A1* | 12/2010 | Thakur | E21B 43/00 166/250.01 |
| 2011/0011595 A1* | 1/2011 | Huang | E21B 43/00 166/369 |
| 2011/0144914 A1* | 6/2011 | Harrington | C12Q 1/6883 702/19 |
| 2013/0124171 A1* | 5/2013 | Schuette | G06F 17/5009 703/2 |
| 2014/0278130 A1* | 9/2014 | Bowles | G06F 19/704 702/19 |
| 2014/0278807 A1* | 9/2014 | Bohacek | G06Q 30/0206 705/7.35 |
| 2014/0282586 A1* | 9/2014 | Shear | G06F 9/5072 718/104 |
| 2014/0365409 A1* | 12/2014 | Burch | E21B 41/0092 706/12 |
| 2015/0142446 A1* | 5/2015 | Gopinathan | G06Q 40/025 704/270 |

OTHER PUBLICATIONS

Teknomo, Kardi PhD., "How to Use a Decision Tree?" Tutorial on Decision Tree Classifier, www.people.revoledu.com/kardi/tutorial/DecisionTree/how-to-use-decision-tree.htm, 2013, pp. 1-3.

Teknomo, Kardi PhD., "How to Measure Impurity?" Tutorial on Decision Tree, www.people.revoledu.com/kardi/tutorial/DecisionTree/how-to-measure-impurity.htm, 2013, pp. 1-4.

Teknomo, Kardi PhD., "How Decision Tree Algorithm Work?" Tutorial on Decision Tree, www.people.revoledu.com/kardi/tutorial/DecisionTree/how-decision-tree-algorithm-work.htm, 2013, pp. 1-6.

Wikipedia, Decision tree learning, 2013, pp. 1-7.

* cited by examiner

PREDICTING WELL PERFORMANCE WITH FEATURE SIMILARITY

CROSS-REFERENCE TO RELATED APPLICATION

This application claims priority to U.S. provisional patent application No. 61/924,457, filed Jan. 7, 2014, which is hereby incorporated by reference in its entirety.

BACKGROUND

Despite recent technological and economic advances in the fields of renewable energy, the world still obtains the majority of its energy needs from traditional fuels, such as oil and natural gas. Drilling new wells is a costly and time-consuming endeavor. Consequently, it is desirable to be able to predict the performance characteristics of new wells. In this way, the time and money spent on well planning, drilling, and operational activities can be focused on higher productivity wells that exhibit lower drilling costs, lower operational costs, and increased operational safety.

SUMMARY

Onshore oil and/or natural gas deposits tend to be located in fields than can span up to millions of square miles. Often, multiple wells are drilled throughout various locations in a particular field. Despite their geographic proximity, these wells may exhibit different degrees of productivity, cost, and safety.

For instance, if two wells are drilled several miles apart from one another in the same field, one of these wells might outperform the other in terms of productivity and safety, while the other might have a lower cost. As an example, drilling through a softer rock might be less expensive than drilling through a harder rock, but might provide access to a smaller oil reserve.

When determining where to locate a third well, it would be ideal to determine, if possible, a location that combines the productivity and safety characteristics of the first well with the cost characteristics of the second well. However, well location is not the only factor. Other aspects of the wells, such as diameter, depth, slant, lateral length, drilling equipment, stimulation, and so on can also play a role. Notably, dozens of geological, hydrological, mechanical, and procedural factors can be identified that may influence the productivity, cost, and safety of a particular well. Some of these factors may have a strong influence on productivity, cost, and safety, while others may have little or no influence.

Therefore, it may be beneficial to identify which of these input features have the strongest impact on the output characteristics of wells. With this knowledge, new wells can be drilled and operated with greater productivity, lower cost, and/or higher safety.

In an example embodiment, a first set of input features related to wells and a set of output characteristics related to the wells may be obtained. For each of a plurality of operational wells, input factor values for the input features of the respective operational wells and output characteristic values for the output characteristics of the respective operational wells may also be obtained. At least some of the input factor values and output characteristic values may be compared. Based on the comparison, a second set of input features that influence the output characteristics may be determined. The second set may be a subset of the first set.

A further or separate aspect may include training a predictive model of well performance. The predictive model of well performance may take as input (i) at least some of the input factor values and output characteristic values, and (ii) particular input factor values of a proposed well for the second set of input features. The predictive model of well performance may provide one or more output characteristic values for the proposed well.

In another example embodiment, an article of manufacture may include a non-transitory computer-readable medium, having stored thereon program instructions that, upon execution by a computing device, cause the computing device to perform operations. These operations may involve obtaining a first set of input features related to wells and a set of output characteristics related to the wells. The operations may also include obtaining, for each of a plurality of operational wells, input factor values for the input features of the respective operational wells and output characteristic values for the output characteristics of the respective operational wells. The operations may further include comparing at least some of the input factor values and output characteristic values. The operations may additionally include, based on the comparison, determining a second set of input features that influence the output characteristics. The second set may be a subset of the first set.

Further or separate operations may include training a predictive model of well performance. The predictive model of well performance may take as input (i) at least some of the input factor values and output characteristic values, and (ii) particular input factor values of a proposed well for the second set of input features. The predictive model of well performance may provide one or more output characteristic values for the proposed well.

In yet another example embodiment, a computing device may include a transceiver configured to obtain a first set of input features related to wells, a set of output characteristics related to the wells, and, for each of a plurality of operational wells, input factor values for the input features of the respective operational wells and output characteristic values for the output characteristics of the respective operational wells. The computing device may also include a processing unit configured to compare at least some of the input factor values and output characteristic values, and, based on the comparison, determine a second set of input features that influence the output characteristics, wherein the second set is a subset of the first set.

The processing unit may be further or separately configured to train a predictive model of well performance. The predictive model of well performance may take as input (i) at least some of the input factor values and output characteristic values, and (ii) particular input factor values of a proposed well for the second set of input features. The predictive model of well performance may provide one or more output characteristic values for the proposed well.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Figure 1:
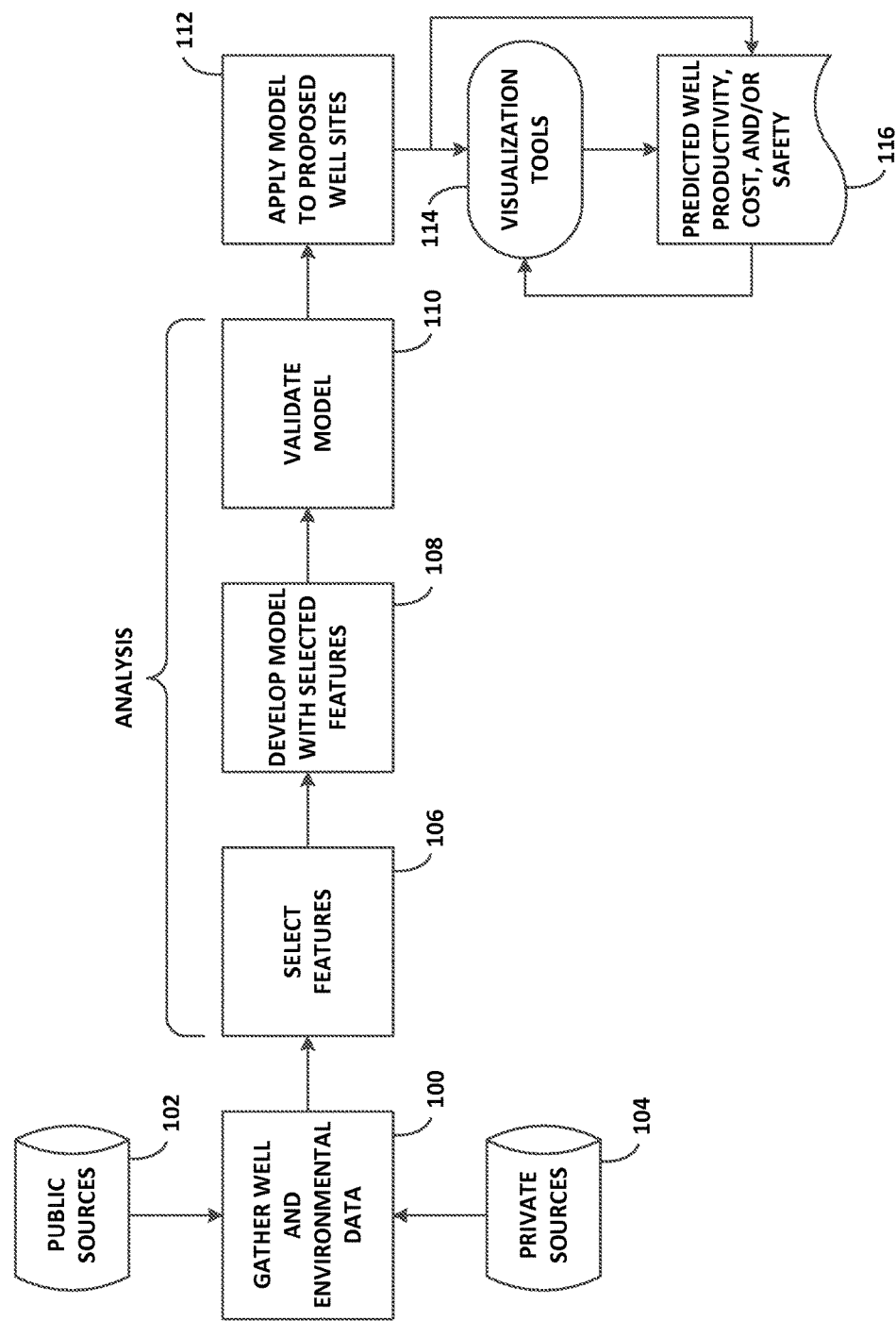
FIG. 1 is a high-level depiction of well similarity analysis, according to an example embodiment.

FIG. 1 is a high-level depiction of an example well similarity analysis procedure. By following this procedure, the output characteristics of one or more proposed well sites may be predicted. The type of well described herein is typically an oil or gas well located in an onshore/on-land location, but the present embodiments may be used with other types of wells, such as offshore/deep water locations.

At step 100, well and environmental information is gathered. As shown in FIG. 1, this information may be gathered from public sources 102 and/or private sources 104. For instance, public sources may include federal, state, and local government data, such as geological survey data, and well information reported to regulatory bodies. Private sources may include data gathered by entities that drill and/or own wells in the general vicinity of the proposed well sites. However, other data may also be gathered.

At step 106, input features are selected. The feature selection process, which is detailed in the following sections, involves identifying input features of the gathered data, and selecting those that are likely to have the most significant impact on the output characteristics of wells drilled at the proposed sites. For instance, some of these input features might include well location (e.g., latitude and longitude), depth, drilling slant, lateral length, number of stimulation stages, volume of proppant injected into the well, type of proppant injected into the well, drilling equipment and procedures used, rock porosity at the well location, and initial reservoir pressure at the well location. Other input features, ranging up to hundreds or even thousands of input features, may also be identified.

Of the input features, some may have little or no impact on well output characteristics, while others may have a significant impact on well output characteristics. Well output characteristics include well productivity (e.g., barrels of oil over a particular period of time), well costs (e.g., drilling cost and/or ongoing operational costs), and/or well safety (e.g., frequency and/or severity of injuries during well drilling and/or operation). However, other output characteristics may be used instead of or in addition to those described above.

In order to select input features, a comparison between the values of some or all input features and the values of output characteristics of a particular set of wells may be made. The wells in this set may be randomly chosen. The comparison may involve some form of regression analysis. Example analytical tools include, but are not limited to, decision trees, random forest, and support vector machines. Regardless of the analytical tool employed, the goal of the analysis is to determine which input features have the most significant impact on the well output characteristics. In order to simplify the analysis, the number of features selected should be small than the number of total features, perhaps one-quarter to one-tenth as many.

A separate analysis and feature selection step may be performed for each output characteristic. Thus, for example, if the output characteristics of interest are well productivity and well cost, step 106 may be performed twice, and different sets of features may be selected each time.

At step 108, a model of well output characteristics may be developed based on the features selected in step 106. This model may predict one or more output characteristics of a proposed well site, based on the values of the input features associated with these features. If multiple output characteristics are of interest, separate models for each may be developed.

At step 110, the model(s) may be validated. One way of doing so is to test the model against the output characteristics of an actual well site that was not used to develop the model. For instance, in a given oil field of 100 wells, 75 may be randomly chosen as training data for the model of step 108. Once the model is developed, it may be tested against the remaining 25 wells.

For a given output characteristic, the value predicted by the model may be compared to the actual value exhibited by the well. The difference between these values is considered error, and may be expressed as an absolute error. Over the remaining 25 wells, the aggregate error may be characterized as the total absolute error, mean squared error, root mean squared error, median error, or in some other fashion. If the aggregate error is sufficiently small (e.g., less than a particular value or less than the aggregate error produced by another model), the modeling may be considered a success, and the model may be considered validated.

At step 112, a validated model may be applied to proposed well sites. Application of the validated model may result in predicted well output characteristics 116 for each proposed site. Thus, the model may help determine where to purchase land and/or mineral rights to land, as well as where and how to drill wells on this land. In some cases, visualization tools 114 may be used in order to allow a user to change the values of one or more input features for a proposed well site, and see how these changes impact well output characteristics.

Additional techniques, steps and procedures may be used within the framework of FIG. 1. Thus, FIG. 1 is for purposes of illustration and should not be considered limiting.

2. Example Computing Devices and Cloud-Based Computing Environments

Figure 2:
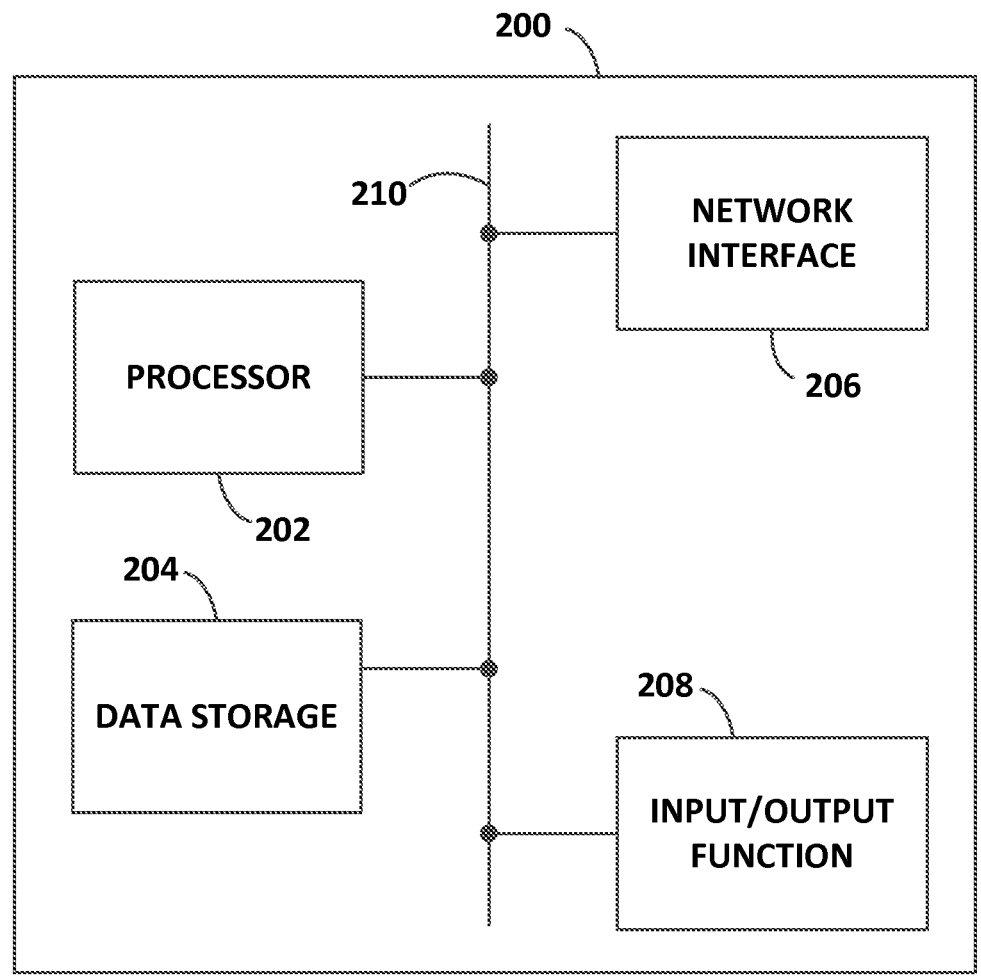
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, server, or some other type of computational platform. For purposes of simplicity, this specification may equate computing device 200 to a server from time to time, and may also refer to some or all of the components of computing device 200 as a "processing unit." Nonetheless, it should be understood that the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
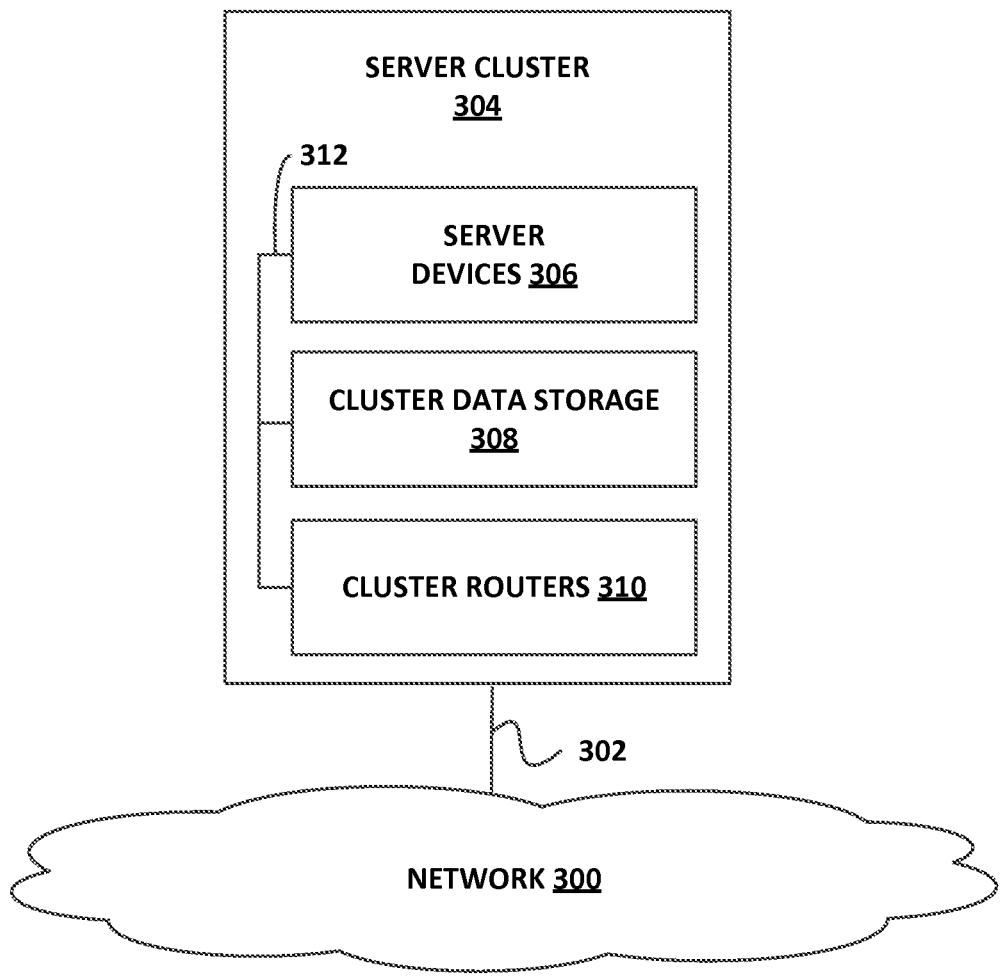
FIG. 3 illustrates a schematic drawing of a networked server cluster, according to an example embodiment.

FIG. 3 depicts a cloud-based server cluster 304 in accordance with an example embodiment. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

3. Example Well Input Features and Well Output Characteristics

As noted above, a well may have various input features that influence its output characteristics. In this section an overview of well drilling is provided, and examples of input features and output characteristics are introduced. This process may be similar, to some extent, to processes used for drilling other types of wells.

A. Well Drilling Overview

Sites are selected for drilling via a well planning process typically conducted by teams of geoscience experts. These teams may evaluate quantities of data, drill test wells to learn about the nature of the underlying geology, and/or attempt to make determinations about the performance potential of each well drilled. To optimize efficiency of drilling activities, multiple drilling operations in the same area are often contemplated so that they can be coordinated and executed in parallel subsequent operations.

A well may be created by drilling a hole into the earth with a drilling rig. The hole may be 5 to 50 inches in diameter, but narrower or wider holes may be drilled. The hole might not be drilled straight down. For many wells, holes are drilled laterally or horizontally.

To drill the hole, a drilling rig rotates a drill pipe with a bit attached. As or after the hole is drilled, sections of steel casings may be placed into the hole. Concrete may also be placed between the outside of the casing and the hole. The casing and concrete provide structural stability for the well.

With the hole protected by the casing and concrete, the well may be drilled deeper with a smaller bit, possibly within a smaller casing. This process may repeat a number of times, with the hole being drilled by progressively smaller bits inside of narrower casings.

The drill bit, possibly aided by the weight of drill collars above it, either slices into the rock or otherwise breaks the rock down into smaller pieces. Drilling fluid, sometimes called "mud," may also be pumped into the drill pipe to cool the drill bit as well as to normalize the pressure differential between the hole and the surrounding rock. The rock pieces cut by the bit may be brought to the surface outside of the drill pipe.

After the well is drilled and cased, it may be completed so that it can produce and recover hydrocarbons. Small holes, sometimes referred to as "perforations" may be made in the casing at a depth at which the oil reservoir exists. These provide a path for the hydrocarbons to flow from the surrounding rock, up the well shaft, and to the surface. In some wells, the pressure of the hydrocarbon reservoir is high enough for the hydrocarbons to flow to the surface. However, if this is not the case, artificial lift methods can be used to force hydrocarbons out of the ground.

In some cases, fissures in formations of hard rock surrounding the well can be created by hydraulically injecting water, sand, and/or chemicals into the rock. When the hydraulic pressure is removed from the well, small grains of proppant (e.g., sand or aluminum oxide) may be used hold the fissures. This process is known as "stimulation" and may take place in multiple stages. In this way, hydrocarbons that otherwise would be inaccessible might become available for production.

B. Input features

Input features are typically aspects of a particular well's location, physical traits, and the drilling processes that were used to form the well. These features may include, but are not limited to, the following:

Date of stimulation: The date that a particular well formation was stimulated via an injection process.

Spud date: The date that a particular well was spud for drilling. The term "spud" in the art of well drilling may refer to the very start of drilling.

Stimulated formation: The geological name of the formation where the stimulation took place. For example, the shale deposit in the northwestern part of North Dakota may be referred to as the "Bakken" formation. Within that formation, there are multiple layers, typically referred to individually as a "shelf" Each shelf within the formation also typically has a reference name, such as "Middle Bakken," "Upper Bakken," or "Three Forks."

Average porosity: The average projected porosity of the rock in the stimulated formation (e.g., between 0% and 100%).

Stimulation stages: The total number of stimulations done along the lateral length of a particular well during the drilling and completion process.

Fluid system type: The type of fluid utilized during the drilling and completion process of a particular well.

Sleeve stages: The type of sleeves (e.g., casings) that were used during the drilling and completion process of a particular well.

Maximum treatment pressure: The maximum pressure achieved during the drilling and completion process of a particular well.

Operator: The current operator of a particular well. For example, the corporation, or other entity that is in charge of the drilling and/or production of the well.

Water saturation: An estimated measure of the amount of water discovered among the hydrocarbons recovered for a particular well. Water saturation can be expressed either as an absolute amount (e.g., a number of gallons) or a percentage of fluids recovered (e.g., 3%, 5%, etc.).

Proppant type: The type of material used in the proppant mixture during the drilling and completion process of a particular well.

Ceramic volume: The volume of ceramic material utilized during the drilling and completion process of a particular well.

Completion type: The method for completion used during the drilling and completions process of a particular well (e.g., perforations made in the casings, etc.).

Oil viscosity: A measure of the density of oil hydrocarbons recovered from a particular well.

Longitude: A reference to the precise geographic location of a particular well.

Latitude: A reference to the precise geographic location of a particular well.

Elevation: The distance above sea level at which drilling began for a particular well.

Equipment type: The type of drilling equipment used to drill a particular well. This input feature may take the form of a list of equipment, and may include make and model names/numbers for each piece of equipment in the list.

C. Output Characteristics

Output characteristics are typically aspects of a particular well's performance after substantive drilling is complete and the well is producing. These output characteristics may include, but are not limited to, the following:

Well productivity: the amount of hydrocarbons produced by the well over a given period of time. This characteristic is often measured in barrels, and the period of time may be 30 days, 60 days, 90 days, 120 days, 180 days, or some other range.

Well cost: the extent of money and/or resources spent to drill the well and/or operate the well over a period of time. Well cost may include real estate, mineral rights, machinery, geophysical survey, raw materials, and/or personnel costs. The period of time may be 30 days, 60 days, 90 days, 120 days, 180 days, or some other range.

Well safety: This characteristic may be measured in various ways, but is typically an indication of the number of injuries to well-operations personnel, and/or severity of those injuries, over a period of time. For instance, injuries may be classified as minor (resulting in no missed days of work), major (resulting in one or more missed days of work), or catastrophic (resulting in death). The period of time may be 30 days, 60 days, 90 days, 120 days, 180 days, or some other range.

4. Example Feature Selection and Model Development

In this section an example of feature selection and model development is provided. For purposes of illustration and simplicity, only three input features and one output characteristic are considered, and the data set is small. In practice, many more input features, output characteristics, and data set entries may be used. Also, this example uses a feature selection technique known as a decision tree. Other feature selection techniques, such as random forest and/or support vector machines may also be used. Further, the values of input features and output characteristics used in this example were chosen for convenience and may not represent the values exhibited in actual wells. Thus, this example should be considered a non-limiting illustration.

TABLE 1

Training Well Data (First Iteration).

| Training Well | Stimulation Stages | Depth (feet) | Initial Reservoir Pressure (PSI) | 90-Day Production (Barrels) |
|---|---|---|---|---|
| A | 20 | 5,000 | 50 | 30,000 |
| B | 15 | 4,500 | 45 | 27,000 |
| C | 18 | 5,100 | 35 | 26,000 |
| D | 10 | 5,500 | 30 | 20,000 |
| E | 25 | 5,300 | 33 | 35,000 |
| F | 17 | 5,200 | 37 | 18,000 |

Table 1 provides example training well data. For each well (A, B, C, D, E, and F), input features are provided (the number of stimulation stages, the depth of the well in feet, and the initial reservoir pressure (pressure) in pounds per square inch (PSI)), and an output characteristic is provided (the well's actual 90-day oil production in barrels). This training well data may be used to predict the 90-day production of proposed wells based on the input characteristics of the proposed wells.

Figure 4A:
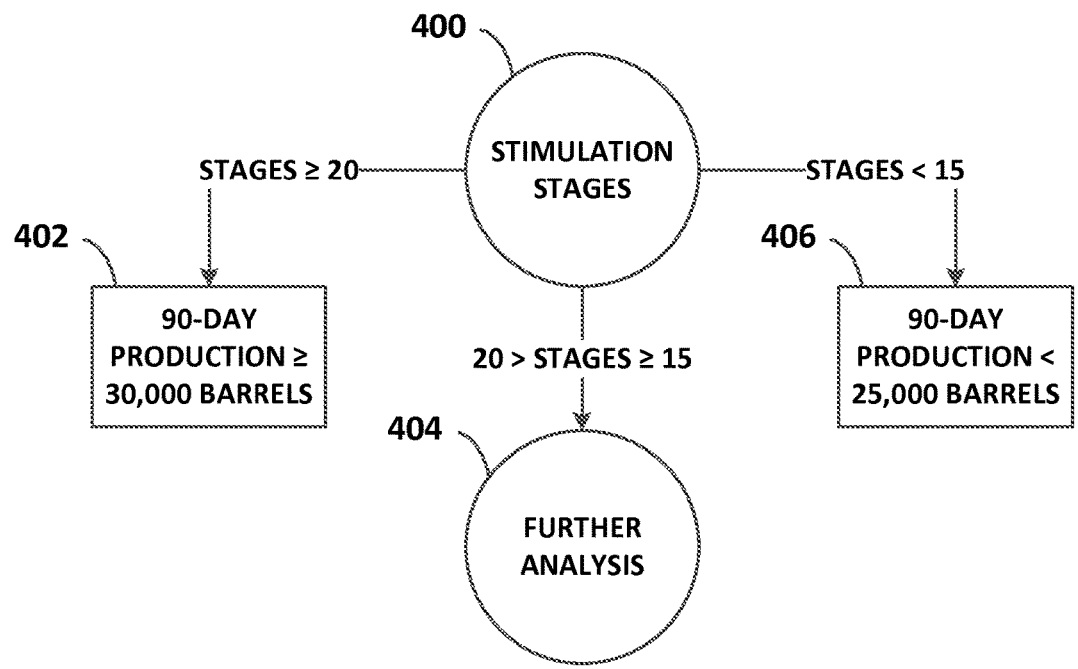
FIG. 4A is a partial decision tree, according to an example embodiment.
Figure 4B:
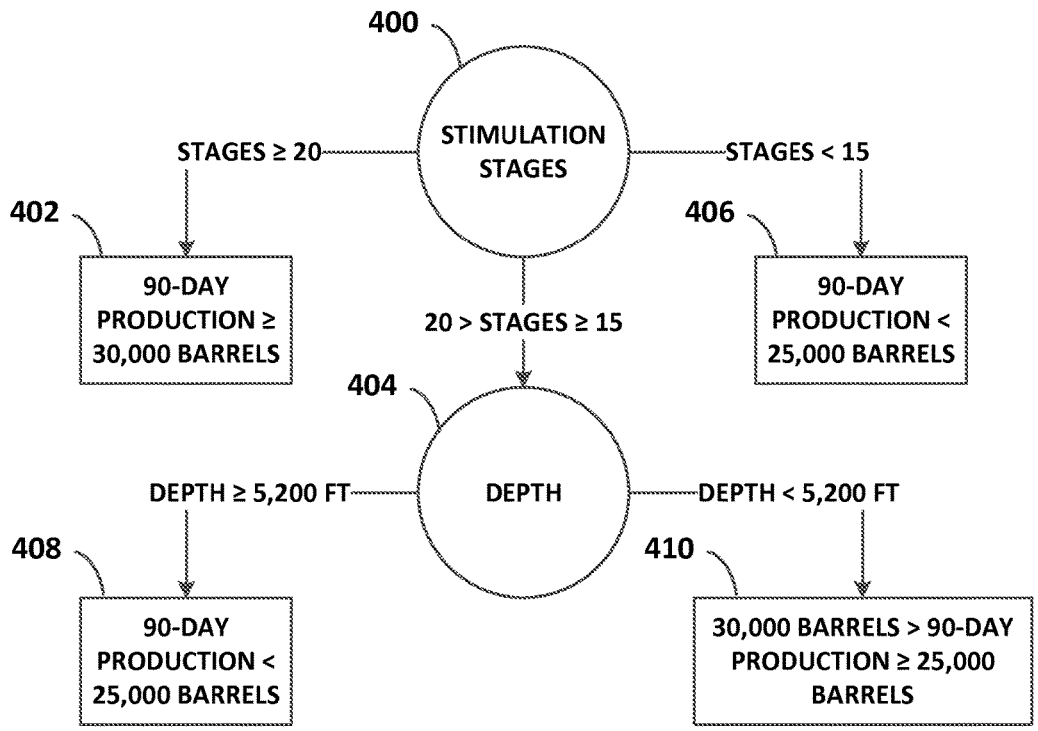
FIG. 4B is a decision tree, according to an example embodiment.

In order to make these predictions, a decision tree can be constructed in an iterative (or recursive) fashion. In short, a decision tree maps the values of input features to values of output characteristics using a tree-like structure. An example of a decision tree for the training well data is shown in FIG. 4B, and this section explains how the tree is built and used.

Since the input features and output characteristics are not limited to a small number of discrete values, the range for each of the input factor and output characteristic values is divided into "buckets." Each bucket represents a subset of the observed range for its respective input factor or output characteristic. The buckets for each input feature and output characteristic discussed herein were chosen for purposes of convenience. In practice, different arrangements of buckets may be used, and the ranges for buckets may be chosen in a methodical fashion.

TABLE 2

90-Day Production Buckets (First Iteration).

| 90-Day Production Buckets | Bucket Contents (Wells) | Probability |
|---|---|---|
| prod ≥ 30,000 (X) | 2 (A, E) | 0.333 |
| 30,000 > prod ≥ 25,000 (Y) | 2 (B, C) | 0.333 |
| 25,000 > prod (Z) | 2 (D, F) | 0.333 |

The buckets for 90-day production are shown in Table 2. In this table, 90-day production is divided into three buckets: wells that produce 30,000 barrels or more in their first 90 days, wells that produce from 25,000 up to 30,000 barrels in their first 90 days, and wells that produce less than 25,000 barrels in their first 90 days. These buckets are labeled with the shorthand representations X, Y, and Z, respectively.

In each bucket are two wells, as indicated in the second column. In the third column the probability of any of the 6 wells falling into each bucket is given. Since there are two wells in each bucket, this probability is 2/6=0.333 for each bucket. Note that for Table 2, and throughout this section, all decimal values are rounded to the nearest thousandth.

One can measure the extent to which the data in Table 2 is skewed by determining, for example, its entropy or its Gini index. Such a measurement may be used throughout this example to determine the impact that each input factor has on 90-day production.

The entropy of a data set is given by the equation:

$$e = \sum_i -p_i \log_2(p_i)$$

Where $p_i$ is the probability of a particular outcome. Thus, for the data of Table 2, the entropy is:

$$e = -0.333 \log_2(0.333) - 0.333 \log_2(0.333) - 0.333 \log_2(0.333) = 1.585$$

The Gini index of a data set is given by the equation:

$$g = 1 - \sum_i p_i^2$$

Thus, for the data of Table 2, the Gini index is:

$$g = 1 - (0.333)^2 - (0.333)^2 - (0.333)^2 = 0.667$$

The higher the entropy and the Gini index, the less skewed (more evenly distributed), and therefore uncertain, the data. Note that for a data set with only one value that can be output, both the entropy and the Gini index is 0. In practice, either the entropy or the Gini index need be used for a given analysis. However, in order to illustrate the variety of ways in which this analysis can be performed, the example herein will use both. Nonetheless, other measures of uncertainty, such as Classification Error, may be used instead of entropy and Gini index.

The next step in building the decision tree is to determine the impact of each input factor on the 90-day production of a well. Table 3, Table 4, and Table 5 illustrate this step.

TABLE 3

Stimulation Stages Buckets (First Iteration).

| Stimulation Stages Buckets | Bucket Contents (Wells) | 90-Day Production Buckets | Entropy | Gini Index |
|---|---|---|---|---|
| stages ≥ 20 | 2 (A, E) | X | 0 | 0 |
| 20 > stages ≥ 15 | 3 (B, C, F) | Y, Y, Z | 0.923 | 0.456 |
| 15 > stages | 1 (D) | Z | 0 | 0 |

In Table 3, the stimulation stages are divided into three buckets: 20 or more, at least 15 but less than 20, and less than 15. Two wells, A and E, fall into the first bucket, three wells, B, C, and F, fall into the second bucket, and one well, D, falls into the third bucket.

Notably, all wells that fall into the first bucket also fall into 90-day production bucket X, and all wells that fall into the third bucket also fall into 90-day production bucket Z. Therefore, for this data, the number of stimulation stages used in drilling a well is strongly correlated with the 90-day production of the well, and may be a predictor thereof. To that point, the entropy and the Gini index for the first and third buckets are both 0.

On the other hand, wells that fall into the second bucket may fall into either 90-day production bucket Y or 90-day production bucket Z. Twice as many wells fall into 90-day production bucket Y as 90-day production bucket Z, so the probability that a well that falls into the second bucket also falls into 90-day production bucket Y is 0.667, and the probability that a well that falls into the second bucket also falls into 90-day production bucket Z is 0.333.

Therefore, the entropy and Gini index of the second bucket are given by:

$$e=-0.333 \log_2(0.333)-0.667 \log_2(0.667)=0.923$$

$$g=1-(0.333)^2-(0.667)^2=0.456$$

Based on these results, the average entropy and average Gini index for all buckets in Table 3 can be calculated as:

$$\bar{e} = \frac{2}{6}(0) + \frac{3}{6}(0.923) + \frac{1}{6}(0) = 0.462$$

$$\bar{g} = \frac{2}{6}(0) + \frac{3}{6}(0.456) + \frac{1}{6}(0) = 0.228$$

The average entropy and average Gini index for a given input factor represents the extent that the relationship between the given input factor and the 90-day production output characteristic is skewed. The lower the average entropy and average Gini index, the less skewed the relationship, and the given input factor is a better predictor of the 90-day production output characteristic.

TABLE 4

Depth Buckets (First Iteration).

| Depth Buckets | Bucket Contents (Wells) | 90-Day Production Buckets | Entropy | Gini Index |
|---|---|---|---|---|
| depth ≥ 5200 | 3 (D, E, F) | X, Z, Z | 0.923 | 0.456 |
| 5200 > depth ≥ 4700 | 2 (A, C) | X, Y | 1 | 0.5 |
| 4700 > depth | 1 (B) | Y | 0 | 0 |

This process is repeated for the well depth and pressure input features. In Table 4, depths are divided into three buckets: 5200 feet or more, at least 4700 feet but less than 5200 feet, and less than 4700 feet. Three wells, D, E, and F, fall into the first bucket, two wells, A and C, fall into the second bucket, and one well, B, falls into the third bucket.

All wells that fall into the third bucket also fall into 90-day production bucket Y. Thus, the entropy and the Gini index for the third bucket are both 0. However, wells that fall into the first and second buckets may fall into 90-day production buckets X or Z, and X or Y, respectively.

The entropy and Gini index of the first bucket are given by:

$$e=-0.333 \log_2(0.333)-0.667 \log_2(0.667)=0.923$$

$$g=1-(0.333)^2-(0.667)^2=0.456$$

The entropy and Gini index of the second bucket are given by:

$$e=-0.5 \log_2(0.5)-0.5 \log_2(0.5)=1$$

$$g=1-(0.5)^2-(0.5)^2=0.5$$

Based on these results, the average entropy and average Gini index for all buckets in Table 4 can be calculated as:

$$\bar{e} = \frac{3}{6}(0.923) + \frac{2}{6}(1) + \frac{1}{6}(0) = 0.8$$

$$\bar{g} = \frac{3}{6}(0.456) + \frac{2}{6}(0.5) + \frac{1}{6}(0) = 0.4$$

The average entropy and average Gini index for depth are both higher than the average entropy and average Gini index for stimulation stages. This indicates that, for this data set, the number of stimulation stages of a well is more likely to be predictive of 90-day production of the well than the depth of the well.

TABLE 5

Pressure Buckets (First Iteration).

| Pressure Buckets | Bucket Contents (Wells) | 90-Day Production Buckets | Entropy | Gini Index |
|---|---|---|---|---|
| pressure ≥ 40 | 2 (A, B) | X, Y | 1 | 0.5 |
| 40 > pressure | 4 (C, D, E, F) | X, Y, Z, Z | 1.5 | 0.625 |

Table 5 shows how wells are divided into buckets based on their pressure. For this input factor, there are two buckets: 40 PSI or more, and less than 40 PSI. Two wells, A and B, fall into the first bucket, and the remaining four wells, C, D, E, and F, fall into the third bucket.

The entropy and Gini index of the first bucket are given by:

$$e=-0.5 \log_2(0.5)-0.5 \log_2(0.5)=1$$

$$g=1-(0.5)^2-(0.5)^2=0.5$$

The entropy and Gini index of the second bucket are given by:

$$e=-0.25 \log_2(0.25)-0.25 \log_2(0.25)-0.5 \log_2(0.5)\\=1.5$$

$$g=1-(0.25)^2-(0.25)^2-(0.5)^2=0.625$$

Based on these results, the average entropy and average Gini index for all buckets in Table 5 can be calculated as:

$$\bar{e} = \frac{2}{6}(1) + \frac{4}{6}(1.5) = 1.333$$

$$\bar{g} = \frac{2}{6}(0.5) + \frac{4}{6}(0.625) = 0.583$$

The average entropy and average Gini index for pressure are both higher than the average entropy and average Gini indexes for stimulation stages and depth. Therefore, the number of stimulation stages has the lowest entropy and Gini index of the three input features. This indicates that, for this data set, the number of stimulation stages of a well is more likely to be predictive of 90-day production of the well than the depth or pressure of the well. Consequently, number of stimulation stages is chosen as the root node of the decision tree.

The decision tree represents a decision-making process that can be followed to estimate the 90-day production of proposed wells. A partial decision tree for the data set is shown in FIG. 4A. Root node 400 indicates that the number of stimulation stages is the first input factor to be considered. If the number of stages for a proposed well is greater than or equal to 20, the decision tree indicates, at leaf node 402, that the 90-day production of the proposed well is likely to be greater than or equal to 30,000 barrels. On the other hand, if the number of stages is less than 15, the decision tree indicates, at leaf node 406, that the 90-day production of the proposed well is likely to be less than 25,000 barrels.

Once a leaf node of the decision tree is reached and the 90-day production bucket is determined, an actual value for 90-day production of the proposed well can be estimated. How to obtain this value will be discussed below.

If the number of stages for a proposed well is greater than or equal to 15 and less than 20, the decision tree indicates, at intermediate node 404, that further analysis is warranted. In order to determine the 90-day production bucket for proposed wells with a number of stages from this range, other input features may be considered. Particularly, a second iteration of the decision tree process described above may be performed. In this second iteration, the same buckets are used for 90-day production, depth, and pressure. However, in some cases, different sets of buckets may be used in at least some iterations.

TABLE 6

Training Well Data (Second Iteration).

| Training Well | Depth (feet) | Initial Reservoir Pressure (PSI) | 90-Day Production (Barrels) |
|---|---|---|---|
| B | 4,500 | 45 | 27,000 |
| C | 5,100 | 35 | 26,000 |
| F | 5,200 | 37 | 18,000 |

Table 6 depicts the training well data for this second iteration. The data in Table 6 is a subset of the data in Table 1. Notably, the training well entries in Table 1 that can be mapped to a 90-day production bucket by the partial decision tree of FIG. 4A have been removed. Additionally, the column representing the stimulation stages input factor has also been removed. This permits the analysis to focus on the impact that depth and pressure may have on 90-day production, so that the decision tree can be completed.

TABLE 7

90-Day Production Buckets (Second Iteration).

| 90-Day Production Buckets | Bucket Contents (Wells) | Probability |
|---|---|---|
| prod ≥ 30,000 (X) | 0 | 0 |
| 30,000 > prod ≥ 25,000 (Y) | 2 (B, C) | 0.667 |
| 25,000 > prod (Z) | 1 (F) | 0.333 |

Table 7 shows the 90-day production buckets for the second iteration. The entropy and Gini index for the data in this table are:

$$e = -0.333 \log_2(0.333) - 0.667 \log_2(0.667) = 0.923$$

$$g = 1 - (0.333)^2 - (0.667)^2 = 0.456$$

Next, the entropy and Gini indexes for the depth and pressure input features may be determined.

TABLE 8

Depth Buckets (Second Iteration).

| Depth Buckets | Bucket Contents (Wells) | 90-Day Production Buckets | Entropy | Gini Index |
|---|---|---|---|---|
| depth ≥ 5200 | 1 (F) | Z | 0 | 0 |
| 5200 > depth ≥ 4700 | 1 (C) | Y | 0 | 0 |
| 4700 > depth | 1 (B) | Y | 0 | 0 |

Table 8 shows the contents of the depth buckets. Notably, each depth bucket contains only one well. Thus, the entropy and Gini index for all depth buckets are 0, as are the average entropy and average Gini index for the depth buckets. This suggests that depth is a good choice of an input factor for intermediate node 404 of the decision tree. However, for sake of completeness, pressure buckets are shown in Table 9.

TABLE 9

Pressure Buckets (Second Iteration).

| Pressure Buckets | Bucket Contents (Wells) | 90-Day Production Buckets | Entropy | Gini Index |
|---|---|---|---|---|
| pressure ≥ 40 | 1 (B) | Y | 0 | 0 |
| 40 > pressure | 2 (B, C) | Y, Z | 1 | 0.5 |

One of the entries in Table 9 exhibits non-zero entropy. This establishes that depth is likely a better predictor of 90-day production than pressure. At this point, it is not necessary to calculate average entropy or average Gini index for the pressure buckets, but if these calculations were performed, the results would be as follows:

$$\bar{e} = \frac{1}{3}(0) + \frac{2}{3}(1) = 0.667$$

$$\bar{g} = \frac{1}{3}(0) + \frac{2}{3}(0.5) = 0.333$$

Regardless, the decision tree can now be completed, and is shown in FIG. 4B. Particularly, intermediate node 404 was labeled to indicate that well depth is the second (and final) input factor to be considered. If the depth of a proposed well is greater than or equal to 5,200 feet, the decision tree indicates, at leaf node 408, that the 90-day production of the proposed well is likely to be less than 25,000 barrels. On the other hand, if the depth is less than 5,200 feet, the decision tree indicates, at leaf node 410, that the 90-day production of the proposed well is likely to be at least 25,000 barrels but less than 30,000 barrels.

It should be noted that only stimulation stages and depth are considered in the decision tree. This means that these two input features are estimated to have a significant influence on 90-day production, while pressure does not. This process of building the decision tree is one example of how feature selection can take place—if a feature ends up in the decision tree it is "selected" while features that do not end up in the decision tree are not selected. Thus, the decision tree of FIG. 4B represents both a feature selection technique, as well as a modeling technique. However, different feature selection and modeling techniques may be used.

TABLE 10

Proposed Well Data.

| Proposed Well | Stimulation Stages | Depth (feet) | Initial Reservoir Pressure (PSI) | 90-Day Production (Barrels) |
|---|---|---|---|---|
| G | 23 | 5,700 | 55 | Unknown |
| H | 17 | 4,800 | 45 | Unknown |

With the completed decision tree of FIG. 4B, the expected 90-day production of proposed wells can be estimated. Table 10 provides examples of proposed wells, including their stimulation stages, depths, and pressures.

To determine the 90-day production of proposed well G, the decision tree is traversed starting from root node 400 and using the data associated with that well. Thus, at root node 400, the number of stimulation stages of proposed well G is considered. Since this value is greater than or equal to 20, leaf node 402 is reached, and the estimated 90-day production of proposed well G is greater than or equal to 30,000 barrels.

For proposed well H, the decision tree is traversed, once again starting from root node 400. The number of stimulation stages is 17, so intermediate node 404 is reached. At intermediate node 404, the depth of proposed well H is considered. Since this value is less than 5,200 feet, leaf node 410 is reached, and the estimated 90-day production of proposed well H is at least 25,000 barrels but less than 30,000 barrels.

Since the leaf nodes tree provide estimates of 90-day production amounts in the form of a range, it may be beneficial to estimate values within these ranges for each proposed well. One way of doing so is through linear extrapolation.

Linear extrapolation estimates the location of a particular point on the y-axis of a line graph based on the x-axis value of the particular point and the locations of other points on this graph. The following equation can be used to determine the unknown y-axis value ($y_3$) of a point ($x_3$, $y_3$), where $x_3$ and other points ($x_1$, $y_1$) and ($x_2$, $y_2$) are known:

$$y_3 = y_1 + \frac{x_3 - x_1}{x_2 - x_1}(y_2 - y_1)$$

When applying linear extrapolation to the training well data set and proposed well G for leaf node 402, the x-axis may be the number of stimulation stages and the y-axis may be 90-day production. The training wells that fall into leaf node 402 are A and E. These training wells have stimulation stages values of 20 and 25, respectively, and 90-day production values of 30,000 barrels and 35,000 barrels, respectively. Plugging these values into the linear extrapolation equation results in:

$$y_3 = 30,000 + \frac{23 - 20}{25 - 20}(35,000 - 30000) = 33,000$$

Thus, the estimated 90-day production of proposed well G is 33,000 barrels.

Similarly, when applying linear extrapolation to the training well data set and proposed well H for leaf node 410, the x-axis may be depth and the y-axis may be 90-day production. The training wells that fall into leaf node 410 are B and C. These training wells have depth values of 4,500 feet and 5,100 feet respectively, and 90-day production values of 27,000 barrels and 26,000 barrels, respectively. Plugging these values into the linear extrapolation equation results in:

$$y_3 = 27,000 + \frac{4,800 - 4,500}{5,100 - 4,500}(26,000 - 27,000) = 26,500$$

Thus, the estimated 90-day production of proposed well H is 26,500 barrels.

The technique of linear extrapolation described above is not the only method of estimating a value for 90-day production. Other techniques, such as polynomial extrapolation and various types of regression calculations may be used as well or instead of linear extrapolation.

In some situations, it may be desirable to test the decision tree against a test set of wells in production that were not used to build the decision tree. This validation step typically occurs prior to using the model to predict the output characteristics of a proposed well.

For instance, the 90-day production values predicted by the decision tree may be compared to the actual 90-day production values exhibited by the wells in the test set. The differences between these values is considered error, and may be expressed as a total absolute error, mean squared error, root mean squared error, median error, or in some other fashion. If this error is sufficiently small (e.g., less than a particular value or less than the aggregate error produced by another model), the model may be considered validated.

Using modeling techniques such as those illustrated above in which 90-day production is predicted, multiple production predictions can be made at various time intervals. For example, a curve of predicted production could be drawn over a six month period by executing similar feature selection and statistical modeling techniques for 30, 60, 90, 120, 150, and 180 days of production. This would allow a production curve representing six different predictive data points to be drawn for a prospective well prior to any drilling activity.

Further, similar curves could be drawn representing "confidence intervals" for that same prospective well. For instance, the same predictive model could be used to output three predicted production curves at confidence internals of "P10" (10% confidence), "P50" (50% confidence), and "P90" (90% confidence). Cost, drilling efficiency, long term production performance potential, safety characteristics, and other factors could also be predicted using models built for those purposes. These different forms of analyses may be based on the core feature selection and predictive modeling capabilities.

5. Example Operations

Figure 5:
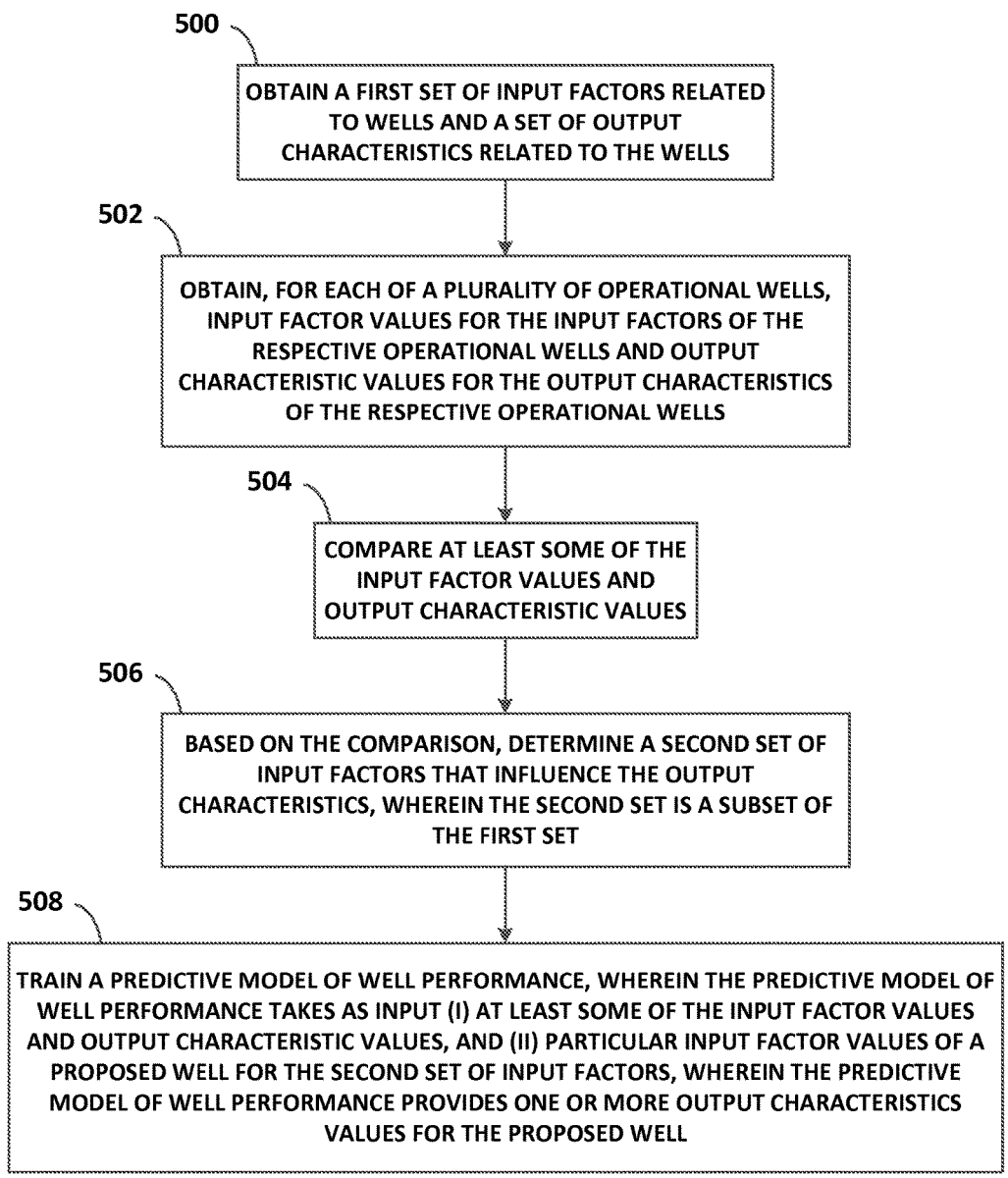
FIG. 5 is a flow chart, according to an example embodiment.

FIG. 5 is a flow chart illustrating a method according to an example embodiment. The process illustrated by FIG. 5 may be carried out by a computing device, such as computing device 200, and/or a cluster of computing devices, such as server cluster 304. However, the process can be carried out by other types of devices or device subsystems. For example, the process could be carried out by a portable computer, such as a laptop or a tablet.

At block 500, a first set of input features related to wells and a set of output characteristics related to the wells may be obtained. The input features include one or more of well location, well drilling slant, well depth, rock porosity at the well location, or reservoir pressure at the well location. The output characteristics may include one or more of well productivity, well cost, or well safety. A first group of the input features may be derived from publicly-available data, and a second group of the input features may be derived from non-public data.

At block 502, for each of a plurality of operational wells, input factor values for the input features of the respective operational wells and output characteristic values for the output characteristics of the respective operational wells may be obtained.

At block 504, at least some of the input factor values and output characteristic values may be compared. Comparing at least some of the input factor values and output characteristic values may involve a regression-based analysis. Alternatively or additionally, comparing at least some of the input factor values and output characteristic values may involve an analysis using at least one of decision trees, random forest, or support vector machines.

At block 506, based on the comparison, a second set of input features that influence the output characteristics may be determined. The second set may be a subset of the first set. The input features in the second set of input features may each have a greater influence on the output characteristics than any input factor not in the second set of input features.

At block 508, a predictive model of well performance may be trained. The predictive model of well performance may take as input (i) at least some of the input factor values and output characteristic values, and (ii) particular input factor values of a proposed well for the second set of input features. The predictive model of well performance may provide one or more output characteristic values for the proposed well. The one or more output characteristic values for the proposed well may be points on one or more respective output curves for the particular well.

In some embodiments, at least some of the second set of input features may be provided for display on a user interface, with ranges of selectable input factor values for each provided input factor. Via the user interface, selected input factor values for at least one provided input factor may be received. Based on the selected input factor values of the provided input features, one or more output characteristic values may be determined. A graphic (e.g., a heat map) representing one or more of the output characteristic values may be provided for display on the user interface.

6. Performance Results

In some possible embodiments, the techniques disclosed herein may be used to improve the selection process for determining the locations of new wells. For example, a region of land with working oil wells may be analyzed. Based on input features of these wells (e.g., location, diameter, depth, slant, lateral length, drilling equipment, stimulation, and so on), a heat map for one or more output characteristics of the wells (e.g., productivity, safety, and/or cost) may be graphically displayed. This heat map may visually represent the output parameter(s) of the wells so that locations likely to provide desirable output characteristics are differentiated from locations less likely to provide desirable output characteristics.

By automating this process, the sensitivity of the wells to numerous input parameters can be rapidly determined. Further, by analyzing the data associated with a large number of wells (e.g., tens, hundreds, thousands, etc.), this computerized technique can provide insight into relationships between input features and output characteristics that would otherwise require extensive amounts of manual labor to obtain (e.g., months, years, or more).

For instance, various additional heat maps can be produced. These additional heat maps may predict the performance of locations and wells (proposed or in production) if the input features were changed. As one possible example, a heat map could be provided that predicts the performance of proposed or existing wells in a particular set of locations if the number of stages of stimulation were increased or decreased.

As such, the techniques described herein improve the industrial process of well drilling. The impact of drilling in various locations and using numerous drilling parameters can be predicted computationally, thus reducing the cost of attempts to test the impact of such locations and parameters, which would otherwise be tested manually. Further, using the techniques described herein may result in improved production, lowered cost, and/or improved safety for wells that are drilled in accordance with at least some of the predictions models.

7. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:
   obtaining, by a computing device, m input features related to wells;
   obtaining, by the computing device, for a plurality of n operational wells, a set of m×n input factor values, wherein m groups of n of the input factor values are respectively associated with the m input features, and wherein the n input factor values of each group are respectively associated with the n operational wells;
   obtaining, by the computing device, n well productivity output values, each measured from one of the n operational wells;
   based on the m×n input factor values and the n well productivity output values, iteratively constructing, by the computing device, a decision tree, wherein the decision tree includes a root node, wherein iteratively constructing of the decision tree continues until all leaf nodes of the decision tree are defined, and wherein each iteration comprises:
   (i) selecting an intermediate node of the decision tree, wherein the selected intermediate node is either the root node or a previously-defined intermediate node;
   (ii) placing each of the n input factor values for each remaining input feature into buckets according to non-overlapping input factor value ranges defined by the buckets, wherein the remaining input features are not yet assigned to any intermediate node;
   (iii) based on the placement of the n input factor values for each input feature into buckets, determining an input feature with a lowest entropy of all of the remaining input features, wherein entropy is inversely proportional with distributional skew of the placement;
   (iv) assigning the determined input feature as a decision point of the selected intermediate node, wherein edges representing the buckets into which the m input factor values were placed each connect the selected intermediate node to another intermediate node or a leaf node, wherein each leaf node is associated with a range of well productivity output values;
   (v) removing the determined input factor from further consideration during further construction of the decision tree;
   beginning at the root node, traversing, by the computing device, the decision tree in accordance with a further set of m input factor values associated with a proposed well in order to determine a predicted well productivity output value for the proposed well, wherein the predicted well productivity output value is based on a particular leaf node that is an endpoint of the traversal;
   providing, for display on a user interface of a client device, j of the m input features with respective ranges of selectable input factor values, wherein the j input features are assigned to intermediate nodes, and wherein j<m;
   receiving, via the user interface and from a user, selected input factor values for at least one of the j input features;
   determining, based on the selected input factor values, one or more predicted well productivity output values; and
   providing, to the client device, a graphic representing the predicted well productivity output values, wherein reception of the graphic by the client device causes the client device to display the graphic.

2. The method of claim 1, wherein the m input features include one or more of well drilling slant, well depth, rock porosity at a well location, or reservoir pressure at the well location.

3. The method of claim 1, wherein a first group of the m input features are derived from publicly-available data, and wherein a second group of the m input features are derived from non-public data.

4. The method of claim 1, wherein j of the m input features are assigned to intermediate nodes, wherein j<m, and wherein the j input features each has a greater statistical influence on the well productivity output values than any of the m input features not in the j input features.

5. The method of claim 1, wherein the predicted well productivity output value for the proposed well is based on a linear extrapolation of one of the further set of m input factor values and a particular range of well productivity output values associated with the particular leaf node.

6. The method of claim 1, wherein the decision tree is one of a random forest of decision trees constructed based on the m×n input factor values and the n well productivity output values.

7. The method of claim 1, wherein the predicted well productivity output value is a point on an output curve for the proposed well.

8. The method of claim 1, wherein the m×n input factor values map to the range of well productivity output values of each leaf node with an entropy of zero.

9. The method of claim 1, wherein a count of intermediate nodes in the decision tree after construction is less than m.

10. An article of manufacture including a non-transitory computer-readable medium, having stored thereon program instructions that, upon execution by a computing device, cause the computing device to perform operations comprising:
- obtaining m input features related to wells;
- obtaining, for a plurality of n operational wells, a set of m×n input factor values, wherein m groups of n of the input factor values are respectively associated with the m input features, and wherein the n input factor values of each group are respectively associated with the n operational wells;
- obtaining n well productivity output values each measured from one of the n operational wells;
- based on the m×n input factor values and the n well productivity output values, iteratively constructing a decision tree, wherein the decision tree includes a root node, wherein iteratively constructing of the decision tree continues until all leaf nodes of the decision tree are defined, and wherein each iteration comprises:
  - (i) selecting an intermediate node of the decision tree, wherein the selected intermediate node is either the root node or a previously-defined intermediate node;
  - (ii) placing each of the n input factor values for each remaining input feature into buckets according to non-overlapping input factor value ranges defined by the buckets, wherein the remaining input features are not yet assigned to any intermediate node;
  - (iii) based on the placement of the n input factor values for each input feature into buckets, determining an input feature with a lowest entropy of all of the remaining input features, wherein entropy is inversely proportional with distributional skew of the placement;
  - (iv) assigning the determined input feature as a decision point of the selected intermediate node, wherein edges representing the buckets into which the m input factor values were placed each connect the selected intermediate node to another intermediate node or a leaf node, wherein each leaf node is associated with a range of well productivity output values;
  - (v) removing the determined input factor from further consideration during further construction of the decision tree;
- beginning at the root node, traversing the decision tree in accordance with a further set of m input factor values associated with a proposed well in order to determine a predicted well productivity output value for the proposed well, wherein the predicted well productivity output value is based on a particular leaf node that is an endpoint of the traversal;
- providing, for display on a user interface of a client device, j of the m input features with respective ranges of selectable input factor values, wherein the j input features are assigned to intermediate nodes, and wherein j<m;
- receiving, via the user interface and from a user, selected input factor values for at least one of the j input features;
- determining, based on the selected input factor values, one or more predicted well productivity output values; and
- providing, to the client device, a graphic representing the predicted well productivity output values, wherein reception of the graphic by the client device causes the client device to display the graphic.

11. The article of manufacture of claim 10, wherein j of the m input features are assigned to intermediate nodes, wherein j<m, and wherein the j input features each has a greater statistical influence on the well productivity output values than any of the m input features not in the j input features.

12. The article of manufacture of claim 10, wherein the predicted well productivity output value for the proposed well is based on a linear extrapolation of one of the m input factor values and a particular range of well productivity output values associated with the particular leaf node.

13. The article of manufacture of claim 10, wherein the predicted well productivity output value is a point on an output curve for the proposed well.

14. A computing device comprising:
- a transceiver configured to obtain (i) m input features related to wells, (ii) for a plurality of n operational wells, a set of m×n input factor values, wherein m groups of n of the input factor values are respectively associated with the m input features, and wherein the n input factor values of each group are respectively associated with the n operational wells, and (iii) n well productivity output values each measured from one of the n operational wells; and
- a processor configured to:
  - based on the m×n input factor values and the n well productivity output values, iteratively constructing a decision tree, wherein the decision tree includes a root node, wherein iteratively constructing of the decision tree continues until all leaf nodes of the decision tree are defined, and wherein each iteration comprises:
    - (i) selecting an intermediate node of the decision tree, wherein selected the intermediate node is either the root node or a previously-defined intermediate node;
    - (ii) placing each of the n input factor values for each remaining input feature into buckets according to non-overlapping input factor value ranges defined by the buckets, wherein the remaining input features are not yet assigned to any intermediate node;
    - (iii) based on the placement of the n input factor values for each input feature into buckets, determining an input feature with a lowest entropy of all of the remaining input features, wherein entropy is inversely proportional with distributional skew of the placement;
    - (iv) assigning the determined input feature as a decision point of the selected intermediate node, wherein edges representing the buckets into which the m input factor values were placed each connect the selected intermediate node to another intermediate node or a leaf node, wherein each leaf node is associated with a range of well productivity output values;
    - (v) removing the determined input factor from further consideration during further construction of the decision tree;
  - beginning at the root node, traversing the decision tree in accordance with a further set of m input factor values associated with a proposed well in order to determine a predicted well productivity output value for the proposed well, wherein the predicted well productivity output value is based on a particular leaf node that is an endpoint of the traversal;

providing, for display on a user interface of a client device, j of the m input features with respective ranges of selectable input factor values, wherein the j input features are assigned to intermediate nodes, and wherein j<m;

receiving, via the user interface and from a user, selected input factor values for at least one of the j input features;

determining, based on the selected input factor values, one or more predicted well productivity output values; and providing, to the client device, a graphic representing the predicted well productivity output values, wherein reception of the graphic by the client device causes the client device to display the graphic.

15. The computing device of claim 14, wherein a first group of the m input features are derived from publicly-available data, and wherein a second group of the m input features are derived from non-public data.

16. The computing device of claim 14, wherein j of the m input features are assigned to intermediate nodes, wherein j<m, and wherein the j input features each has a greater statistical influence on the well productivity output values than any of the m input features not in the j input features.

17. The computing device of claim 14, wherein the predicted well productivity output value is a point on an output curve for the proposed well.

* * * * *